March 11, 1941. S. R. PUFFER 2,234,777
LUBRICATING SYSTEM
Filed Feb. 16, 1938
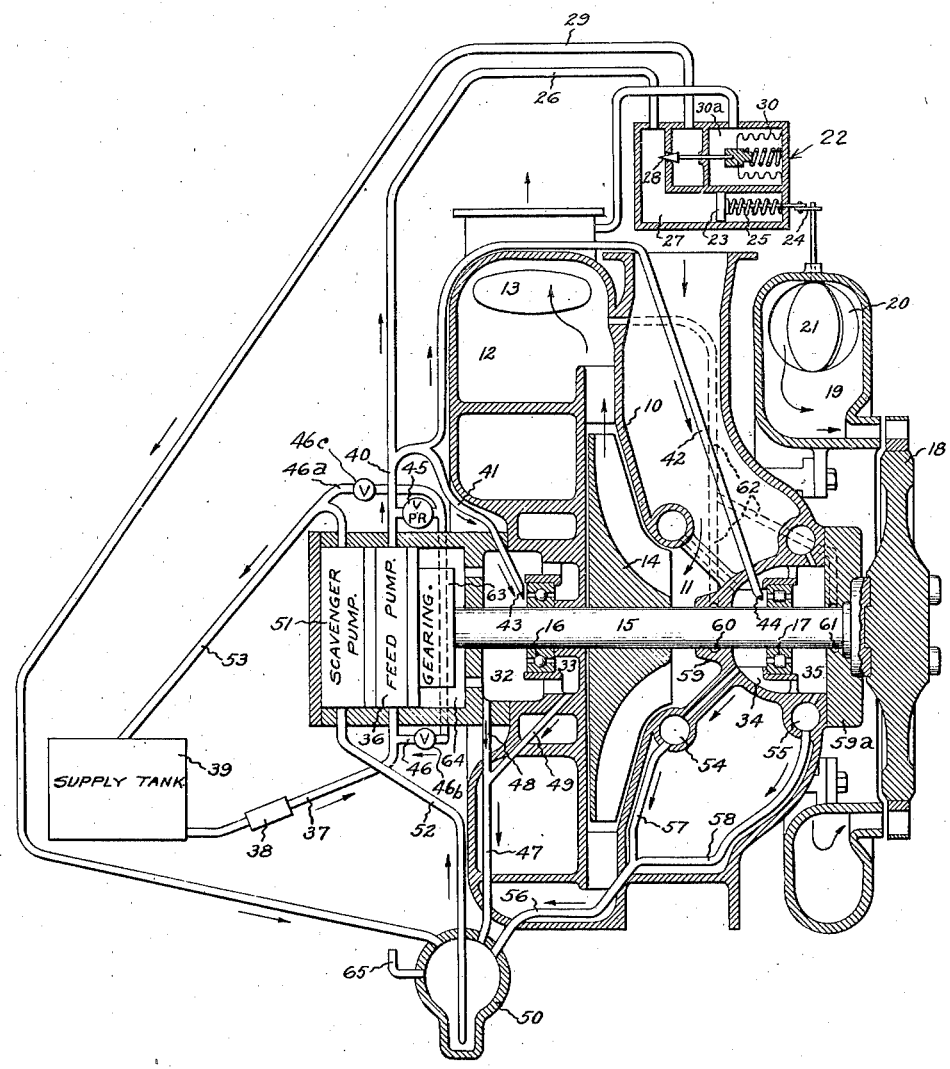
Inventor:
Samuel R. Puffer,
by Harry E. Dunham
His Attorney.

Patented Mar. 11, 1941

2,234,777

UNITED STATES PATENT OFFICE 2,234,777

LUBRICATING SYSTEM

Samuel R. Puffer, Saugus, Mass., assignor to General Electric Company, a corporation of New York Application February 16, 1938, Serial No. 190,812

5 Claims. (Cl. 184—6)

The present invention relates to lubricating systems for automatically lubricating the bearings of exhaust gas turbine driven superchargers for airplanes or like machines which have a shaft changing its angular position during operation or for installation at different angles of its axis.

The object of my invention is to provide an improved automatic lubricating arrangement whereby various bearings of a gas turbine driven supercharger for airplanes and other machines are effectively and efficiently lubricated.

For a consideration of what I believe to be novel and my invention, attention is directed to the following description and claims appended thereto in connection with the accompanying drawing.

The single figure of the drawing shows a gas turbine driven supercharger for airplanes with an automatically lubricated bearing system in accordance with my invention.

The arrangement comprises a supercharger in the form of a centrifugal type compressor having a casing 10 forming an inlet 11 and a scroll 12 with an outlet opening or openings 13. An impeller 14 is located in the impeller chamber formed by the casing and secured to a shaft 15. The shaft is supported by bearings 16 and 17 and driven by a gas turbine which may be operated by the exhaust gases from a combustion engine, not shown. The turbine has a bucket wheel 18 fastened to an overhung portion of the shaft 15 and arranged to receive gases from a nozzle box 19 secured to the casing 10 of the compressor. The nozzle box 19 has an opening to atmosphere 20 with a valve 21 for controlling the flow of gases to the turbine wheel 18. The control of the valve 21 in the present instance is automatically effected in response to changes of the pressure in the air discharge line from the outlet 13 of the supercharger by means including a servo motor 22 with a piston 23 having a stem connected by a link 24 to the valve 21. The piston 23 is subject on one side to the biasing force of a spring 25 and on the opposite side to the oil under pressure supplied by a conduit 26 to a chamber 27. The oil is supplied from a source of constant pressure, as will be described hereinafter, and the oil pressure acting on the piston 23 is varied in response to changes of the air discharge pressure by means of a needle valve 28 controlling the discharge of oil from the chamber 27 to a discharge conduit 29. The needle valve 28 is connected to an evacuated bellows 30. A chamber 30a immediately surrounding the bellows 30 is connected to one of the air discharge conduits from the openings 13, and the evacuated bellows is balanced by a spring. A drop in pressure in the air discharge conduit which is transmitted to the chamber 30a causes expansion of the bellows 30 whereby the needle valve 28 is moved in closing direction and causes an increase in pressure of the chamber 27 which results in movement of the piston 23 towards the right and movement of the valve 21 to increase the flow of gas to the bucket wheel 18 and accordingly the speed of the supercharger.

Each of the bearings 16 and 17 in accordance with my invention is located intermediate two pockets or chambers or from another viewpoint each bearing is located in a space defining a chamber or pocket on each side of the bearing so that at least a portion of a pocket is always underneath the bearing, and oil or other lubricant drains from the bearing into such pocket. More specifically, the bearing 16 is located intermediate two pockets 32 and 33 whereas the bearing 17 is located intermediate two pockets 34 and 35. Oil under pressure is supplied to the bearings by means including a feed pump 36 which has an inlet conduit 37 with a strainer 38 connected to an oil supply tank 39 and a discharge conduit 40 with a branch 41 connected to the bearing 16 and a branch 42 connected to the bearing 17. The end portions of the branches 41 and 42 project into the pockets 32 and 34 respectively and have nozzle shaped ends 43 and 44 respectively for continuously directing a stream of oil onto the corresponding bearings during operation. The resistance in the various branches of the oil supply system may vary considerably during operation. There will also be a required definite oil pressure in the conduit 26 for operating the servo motor 22. Therefore I provide a feed pump with a discharge pressure considerably above that ordinarily required and connect the discharge of the feed pump through a pressure relief valve 45. The discharge from the relief valve 45 may be returned through a bypass conduit 46 to the inlet conduit 37 of the feed pump or it may be led through a conduit 46a to the discharge conduit 53 of the scavenger pump and drained back to the supply tank 39. The conduits 46 and 46a include valves 46b and 46c respectively. Normally, one of the valves is opened and the other closed. If, for instance, valve 46b is opened and valve 46c is closed, the overflow from the pressure relief valve 45 is discharged through the conduit 46 to the inlet of the feed pump. The aforementioned conduit 26 for the hydraulic motor 22 is also connected to the discharge conduit 40 of the feed pump.

Oil is discharged from the chambers or pockets 32, 33 by a conduit 47 having branches 48 and 49 connected to said pockets 32 and 33 respectively and draining into a sump 50, whence the oil is returned to the supply tank 39 by means of a scavenger pump 51 mounted on the same shaft as the feed pump and driven from the shaft 15 and having an inlet conduit 52 connected to the sump 50 and a discharge conduit 53 connected to the supply tank 39. The provision of a scavenger pump is always important whenever the sump is located at a level below the supply tank and is essential in the case of airplane engines where the relative location between the various elements may change during operation. In addition, the provision of a scavenger pump is desired to obtain a continuous and uniform circulation of lubricant through the various bearings. I have found that the best results are obtained by the provision of a scavenger pump with a capacity greater than the capacity of the oil feed pump. Whereas the oil feed pump supplies oil only, the scavenger pump drains from the bearing not only oil but also air leaking into the bearing pockets or chambers. In the position shown with the shaft 15 horizontal the oil supplied to the bearing 16 collects in the lower portion of the pocket 32, whence it is drained through the branch 48. The branch 49 connected to the pocket 33 under such condition drains air from the latter.

The oil drainage from the bearing 17 is similar to that of the bearing 16 but includes additional annular pockets 54 and 55 communicating with and surrounding the pockets 34 and 35 respectively so that oil supplied to the bearing 17 will collect in the pockets 54 and 55, depending upon the position of the shaft 15, whence it drains into a conduit 56 connected to the sump 50 and having branches 57 and 58 connected to the annular pockets 54 and 55 respectively. The amount of oil circulated through the bearing 17 is preferably in excess of that required for lubrication in order to effect at the same time cooling of this bearing and the elements adjacent the hot turbine wheel 18. The pockets 34 and 35 are formed by a casing portion 59 with a cover 59a sealed against the shaft 15 by grooves 60 and 61 formed in the casing portion and the cover. The grooves 60 and 61 are connected by channels 62 to the scroll 12 of the supercharger. Thus air under pressure is continuously supplied to the grooves 60 and 61 to prevent leakage of oil along the shaft 15 from the pockets 34, 35. Both pumps 36 and 51 are mounted on a common shaft and are driven from the shaft 15 through the intermediary of a reducing gearing 63. The gearing 63 is located in a chamber 64. In the event that the supercharger is mounted with the shaft in a vertical position with the pump unit at the bottom, the oil from the chambers 34 and 35, and 32 and 33, may be drained directly into the chamber 64 surrounding the gearing 63, and from there conducted to the inlet of the scavenging pumps. In this case, the chamber 64 takes the place of the sump 50. On the other hand, if the supercharger is mounted vertically with the turbine wheel down, all of the oil may be drained into chambers 35 and 55, which again will take the place of sump 50. As both the air and the oil enter the sump 50 or the pockets 64 or 35, as the case may be, it is desirable to separate as much of this as possible so that the scavenger pump be not overloaded. A vent 65 is provided in sump 50. For other positions of mounting this vent may be connected to the chambers 64 or 35, as the case may be.

As stated above, with the shaft in horizontal position the oil is drained into the pockets 32 and 35 respectively, whence it is discharged to the sump. With the shaft in vertical position and the bucket wheel at the upper end thereof, the oil collects in the pockets 32 and 34 respectively and, vice-versa, if the bucket wheel is at the lower end, the oil collects in the pockets 33 and 35 respectively. Thus, for any position of the shaft 15 there is always one pocket for each bearing containing oil supplied to the bearing and another pocket which is filled with air.

What I claim as new and desire to secure by Letters Patent of the United States is:

1. The combination with a rotary machine having a rotatable shaft subject to varying angular positions during operation and bearings supporting the shaft, of an oil system for automatically supplying oil to the bearings comprising a supply tank, a feed pump having an inlet connected to the tank and an outlet connected to the bearings, a sump, branch conduit means connecting the sump to each bearing for receiving oil from the bearings in varying angular positions of the shaft, at least two branches of the conduit means being connected to opposite sides of each bearing, the connection on one side being at a lower level than the connection on the other side with the shaft in horizontal position, and a scavenger pump having an inlet connected to the sump and an outlet connected to the supply tank, both pumps being driven by the shaft and the scavenger pump having a capacity greater than that of the feed pump.

2. The combination with a machine having a shaft subject to varying angular positions during operation and a bearing for supporting the shaft, of a system for supplying oil to the bearing and draining it from the bearing comprising communicating annular pockets of different diameters formed on opposite sides of and surrounding the bearing, a supply tank for oil, a feed pump having an inlet connected to the supply tank and an outlet connected to the bearing, said last mentioned connection including a conduit with a nozzle projecting into one of the pockets for continuously spraying oil onto the bearing during operation, and means including a conduit having branches connected to the pockets for returning the oil to the supply tank.

3. The combination with a machine having a shaft subject to varying angular positions during operation and a bearing for supporting the shaft of a system for automatically supplying oil to and draining oil and air from the bearing comprising annular pockets directly communicating with each other formed on opposite sides of and surrounding the bearing, a supply tank for oil, a feed pump for forcing oil from the supply tank in the form of a spray towards the bearing, the feed pump having a discharge pressure considerably above that required for lubrication, a bypass with a pressure relief valve connecting the outlet of the feed pump with its inlet, means for draining oil from the pockets and returning it to the supply tank comprising a sump, a conduit having branches for connecting the sump to the pockets, a scavenger pump for forcing oil from the sump into the supply tank, and a reducing gearing for driving both pumps from the shaft, the scavenger pump having a capacity greater than that of the feed pump.

4. The combination with a machine having a shaft subject to varying angular positions during operation and a bearing for supporting the shaft, of a system for automatically supplying oil to and draining oil and air from the bearing comprising annular pockets of different diameters formed on opposite sides of and surrounding the bearing, a channel below the normal position of the shaft connecting the pockets normally to drain all oil from the smaller into the larger pocket, a supply tank for oil, a feed pump for forcing oil from the supply tank to the bearing, the feed pump having a discharge pressure considerably above that required for lubrication, means for draining oil from the pockets and returning it to the supply tank comprising a sump with a vent, a conduit having branches for connecting the sump to the pockets, a scavenger pump for forcing oil from the sump into the supply tank, a bypass with a pressure relief valve connecting the outlet of the feed pump to the discharge of the scavenger pump, and a reducing gearing for driving both pumps from the shaft, the scavenger pump having a capacity greater than that of the feed pump to permit effective removal of air and oil from the pockets.

5. Gas turbine driven supercharger for aircraft subject to varying angular positions during operation comprising a gas turbine having a bucket wheel, a compressor having an impeller, a shaft supporting the wheel and the impeller, a bearing arrangement supporting the shaft and comprising a bearing on each side of the impeller, each bearing forming annular pockets of different diameters adjacent its ends and a channel connecting the pockets, and a lubricating system for circulating lubricant through the bearings comprising a supply tank, a feed pump driven from the shaft and having an inlet connected to the supply tank and a discharge connected to each bearing and means for draining oil from the pockets to the tank including a scavenger pump of a size larger than the feed pump and driven from the shaft and drain conduits having branches connected to the several pockets whereby in a certain position of the shaft one of the branches acts primarily to remove air from one of the pockets and another branch acts primarily to remove lubricant from another pocket of the same bearing.

SAMUEL R. PUFFER.